United States Patent [19]

Araki

[11] Patent Number: 5,390,102
[45] Date of Patent: Feb. 14, 1995

[54] PARALLEL RUNNING CONTROL APPARATUS FOR PWM INVERTERS

[75] Inventor: Hiroshi Araki, Inazawa, Japan

[73] Assignee: Mitsubishi Denki Kabushiki Kaisha, Tokyo, Japan

[21] Appl. No.: 73,038

[22] Filed: Jun. 8, 1993

[30] Foreign Application Priority Data

Jun. 9, 1992 [JP] Japan .................................. 4-149132

[51] Int. Cl.$^6$ ........................................ H02M 7/5387
[52] U.S. Cl. .................................................... 363/71
[58] Field of Search ................... 363/71, 65, 95, 39–41

[56] References Cited

U.S. PATENT DOCUMENTS

| | | |
|---|---|---|
| 4,670,832 | 6/1987 | Park . |
| 4,717,833 | 1/1988 | Small . |
| 4,748,340 | 5/1988 | Schmidt . |
| 4,802,079 | 1/1989 | Mizoguchi . |
| 4,947,310 | 8/1990 | Kawabata et al. . |
| 5,016,158 | 5/1991 | Matsui et al. . |
| 5,191,519 | 3/1993 | Kawakami . |
| 5,212,630 | 5/1993 | Yamamoto et al. .............. 363/71 |

FOREIGN PATENT DOCUMENTS

| | | |
|---|---|---|
| 56-10080 | 4/1981 | Japan . |
| 60-102878 | 2/1985 | Japan . |
| 63-287371 | 6/1988 | Japan . |

*Primary Examiner*—R. Skudy
*Assistant Examiner*—E. To
*Attorney, Agent, or Firm*—Leydig, Voit & Mayer

[57] ABSTRACT

A parallel running control apparatus for PWM inverters controls the parallel running of a plurality of unit inverters controlled in pulse width modulation to supply AC power to a load, output terminals of the unit inverters being connected to each other via interphase reactors. The parallel running control apparatus comprises a current detector, a compensating unit and a control unit. Since a secondary magnetic flux, a slip frequency, and other control variables can be calculated without taking account of any element of disturbance, stable control ensues.

14 Claims, 3 Drawing Sheets

PARALLEL RUNNING CONTROL APPARATUS FOR PWM INVERTERS

BACKGROUND OF THE INVENTION

1. Field of the Invention

The present invention relates to a parallel running control apparatus for pulse-width modulation (hereinafter, PWM) inverters in which a plurality of PWM inverters are run in parallel to perform a variable speed control for an AC motor or the like.

2. Description of the Related Art

FIG. 3 is a configuration diagram of a conventional PWM inverter in which two unit inverters are connected in parallel. In FIG. 3, 10 denotes a first unit inverter. The first unit inverter 10 comprises transistors 10a to 10f which are bridged to one another and diodes 11a to 11f which are connected in an anti-parallel manner with the transistors. 20 denotes a second unit inverter comprising similar transistors 20a to 20f and diodes 21a to 21f. The first and second unit inverters 10 and 20 are connected to a common DC voltage supply E. The output terminals of separate phases of the unit inverters are connected in parallel with one another via interphase reactors 13U to 13W. Current transformers for current detection 12U to 12W and 22U to 22W are provided to detect the output currents of the first unit inverter 10 and second unit inverter 20. The transistors 10a to 10f and 20a to 20f constituting the first and second unit inverters 10 and 20 are connected to a PWM control circuit, which is not shown, for controlling the switching of the transistors.

A parallel running control apparatus, which is not shown, issues three phase AC voltage command values to the PWM control circuit respectively to control the unit inverters 10 and 20 in pulse width modulation. This causes each of the unit inverters 10 and 20 to output AC power with a desired variable voltage and variable frequency. The AC power is then fed to a stator winding of an induction motor or the like.

When the output currents of the unit inverters 10 and 20 are detected by the current transformers 12U to 12W and 22U to 22W, the angular speed of a rotor of the motor is detected at the same time. Based on these detected values, a command value of an angular speed of the rotor, and a command value of an interlinkage magnetic flux, the parallel running control apparatus calculates a secondary magnetic flux, a slip frequency, and other control variables, as well as three phase AC voltage command values.

However, since the output terminals of separate phases of the unit inverters 10 and 20 are connected in parallel with one another via the reactors 13U to 13W, the output currents of the unit inverters 10 and 20 detected by the current transformers 12U to 12W and 22U to 22W include circulating current flowing between the unit inverters 10 and 20. The circulating current poses as an element of disturbance when the parallel running control apparatus calculates the secondary magnetic flux, slip frequency, and other control variables. This results in unstable load control.

SUMMARY OF THE INVENTION

The present invention attempts to solve the foregoing problems of the prior art. An object of the present invention is to provide a parallel running control apparatus for PWM inverters that permits stable control unaffected by circulating current flowing between multiple inverters connected in parallel with one another.

A parallel running control apparatus for PWM inverters relating to the first aspect of the present invention which controls the parallel running of a plurality of unit inverters controlled in pulse width modulation to supply AC power to a load, output terminals of the unit inverters being connected to each other via interphase reactors, the apparatus comprising:

a current detecting means for detecting three phase AC currents output from the plurality of unit inverters;

a compensating means for adding the values of three phase AC currents detected by the current detecting means for each phase to compensate the three phase AC currents so as to eliminate the components of circulating currents flowing between the plurality of unit inverters; and a control means for outputting three phase voltage command values respectively to the plurality of unit inverters based on the three phase AC currents compensated by the compensating means.

A parallel running control apparatus for PWM inverters relating to the second aspect of the present invention which controls the parallel running of a plurality of unit inverters controlled in pulse width modulation to supply AC power to a load, output terminals of the unit inverters being connected to each other via interphase reactors, the apparatus comprising:

a current detecting means for detecting three phase AC currents output from the plurality of unit inverters;

a plurality of three-phase-to-two-phase converters for converting the three phase AC currents of the unit inverters detected by the current detecting means into stator winding currents in a biaxial rotary coordinate system;

a compensating means for adding the stator winding currents converted by the plurality of three-phase-to-two-phase converters for each coordinate axis to compensate the stator winding currents so as to eliminate the components of circulating currents flowing between the plurality of unit inverters;

a control means for outputting voltage command values in the biaxial rotary coordinate system respectively to the plurality of unit inverters based on the stator winding currents compensated by the compensating means; and a plurality of two-phase-to-three-phase converters for converting the voltage command values output from the control means into three phase voltage command values.

DESCRIPTION OF THE PREFERRED EMBODIMENTS

Figure 1:
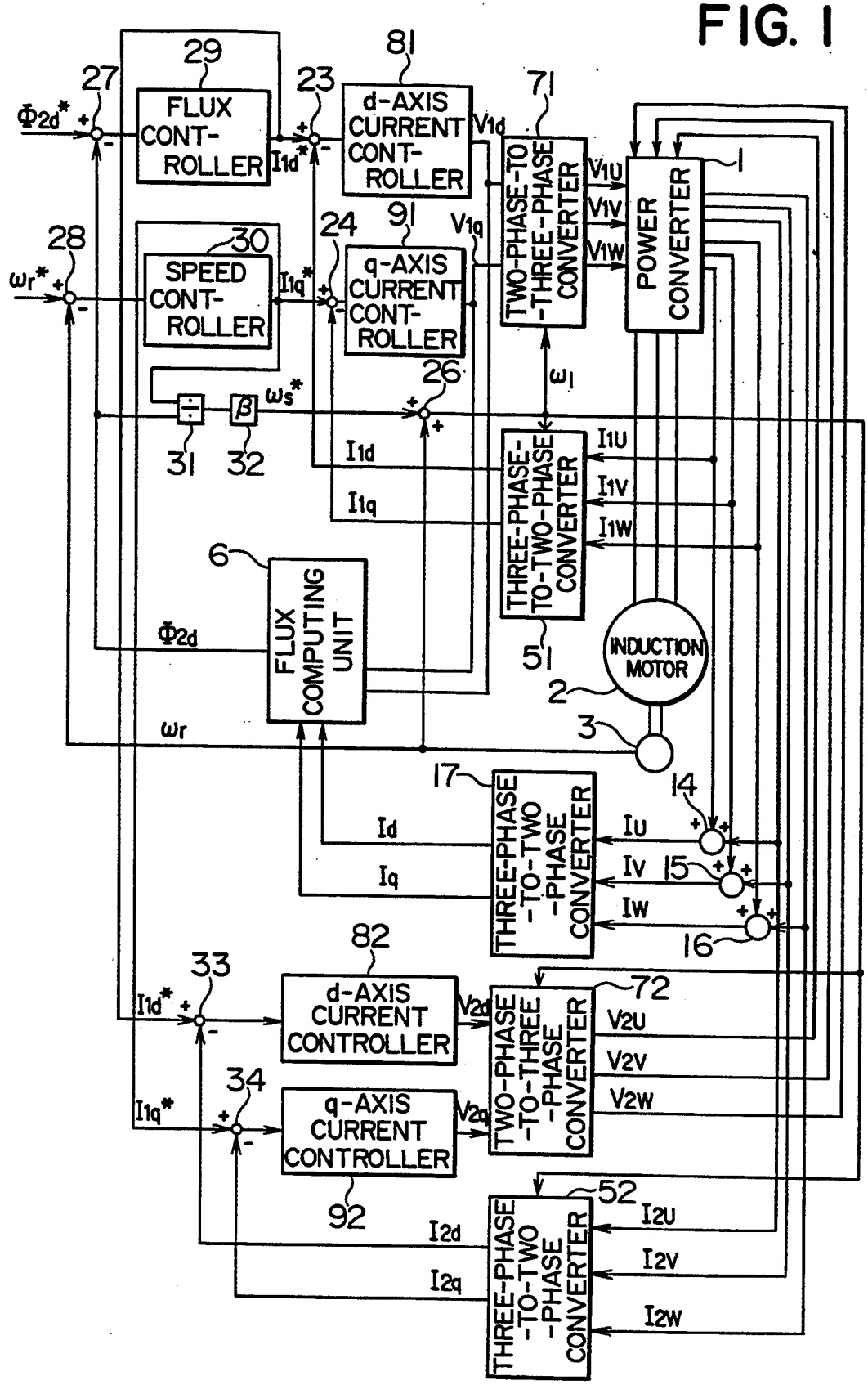
FIG. 1 is a block diagram showing a parallel running control apparatus for PWM inverters relating to Embodiment 1 of the present invention.
Figure 3:
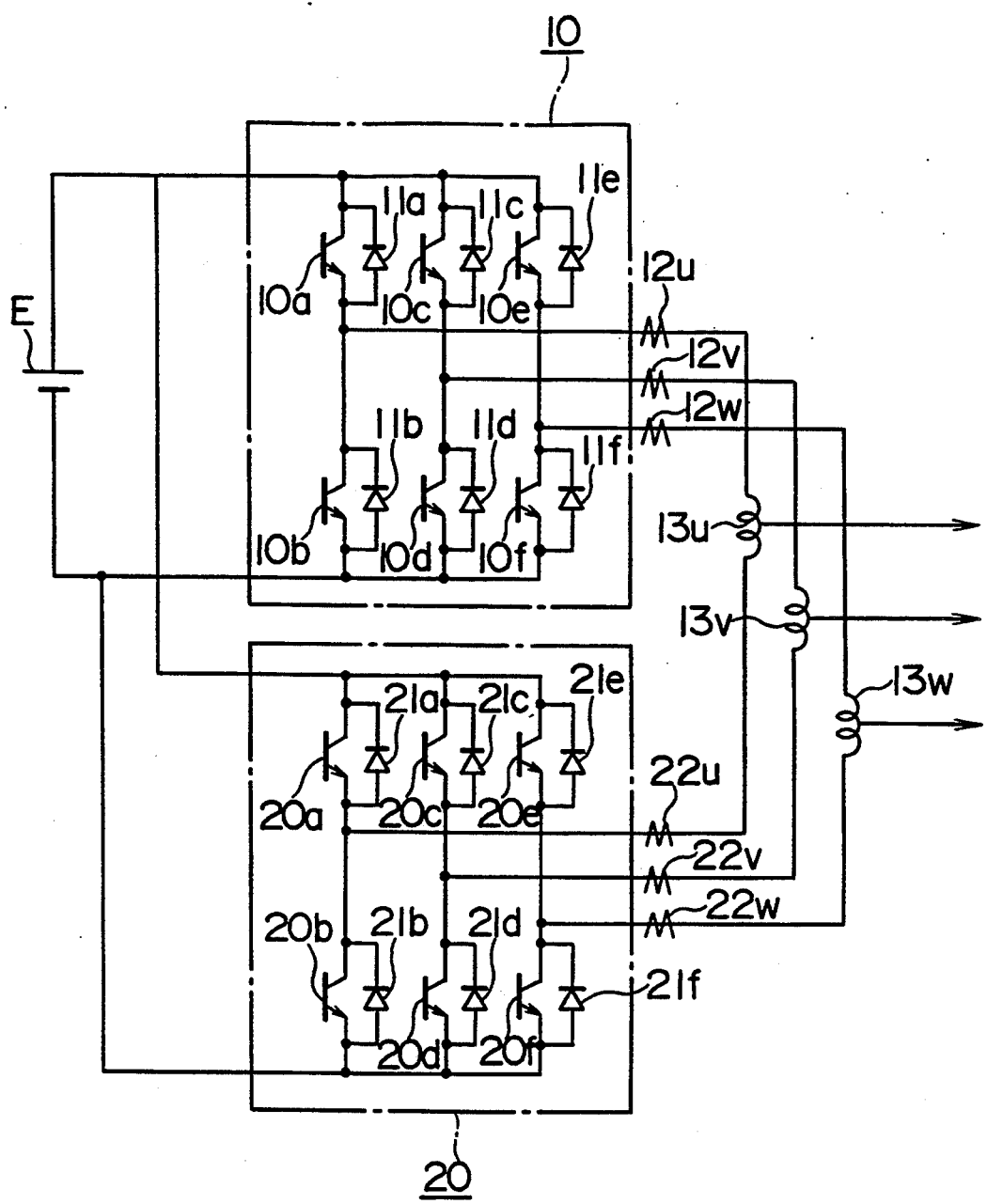
FIG. 3 is a circuit diagram showing main circuits in a PWM inverter.

Embodiment 1:

In FIG. 1, a power converter 1 has a PWM inverter such as that shown in FIG. 3, and a PWM control circuit, which is not shown, for controlling the switching of transistors 10a to 10f and 20a to 20f included in unit inverters 10 and 20 constituting the PWM inverter. The power converter 1 supplies an output whose voltage and frequency have been converted to desired values to the stator winding in an induction motor 2. The induction motor 2 is connected to a speed detector 3 for detecting the angular speed of a rotor.

An adder 14 is connected to the output terminals of current transformers 12U and 22U in the power converter 1. An adder 15 is connected to the output terminals of current transformers 12V and 22V therein. An adder 16 is connected to the output terminals of current transformers 12W and 22W therein. These adders 14 to 16 are connected to a three-phase-to-two-phase converter 17. The converter 17 is connected to a flux computing unit 6 for calculating magnetic fluxes $\Phi\ 2d$ and $\Phi\ 2q$ interlinked with the rotor in the induction motor 2.

Element 29 denotes a flux controller that controls a d-axis component $\Phi\ 2d$ of the interlinked flux of the rotor winding in the induction motor 2 to be a desired command value $\Phi\ 2d^*$. Element 30 denotes a speed controller that controls the angular speed $\omega$ r of the rotor in the induction motor 2 to be a desired command value $\omega$ r*.

A three-phase-to-two-phase converter 51 is connected to the current transformers 12U to 12W in the unit inverter 10 in the power converter 1. A d-axis current controller 81 is connected to the first output terminal of the converter 51 and the flux controller 29 via a subtractor 23. A q-axis current controller 91 is connected to the second output terminal of the converter 51 and the speed controller 30 via a subtractor 24. The power converter 1 is connected to the d-axis current controller 81 and the q-axis current controller 91 via a two-phase-to-three-phase converter 71.

Similarly, a three-phase-to-two-phase converter 52 is connected to the current transformers 22U to 22W of the unit inverter 20 in the power converter 1. A d-axis current controller 82 is connected to the first output of the converter 52 and the flux controller 29 via a subtractor 33. A q-axis current controller 92 is connected to the second output terminal of the converter 52 and the speed controller 30 via a subtractor 34. The power converter 1 is connected to the d-axis current controller 82 and q-axis current controller 92 via a two-phase-to-three-phase converter 72.

The flux computing unit 6 is connected to the d-axis current controller 81 and q-axis current controller 91. The output terminal of the flux computing unit 6 is connected to the input terminal of the flux controller 29 via a subtractor 27. The output terminal of the speed detector 3 is connected to the input terminal of the speed controller 30 via a subtractor 28, An adder 26 is connected to the output terminals of the speed controller 30 and flux computing unit 6 via a divider 31 and a coefficient multiplier 32. The output terminal of the speed detector 3 is connected to the adder 26. The output terminal of the adder 26 is connected to the three-phase-to-two-phase converters 51 and 52, and to the two-phase-to-three-phase converters 71 and 72.

Next, the operation of Embodiment 1 will be described. First, the current transformers 12U 12V, and 12W in the power converter 1 detect the three phase AC currents I1U, I1V and I1W in the unit inverter 10. The current transformers 22U, 22V, and 22W detect the three phase AC currents I2U, I2V and I2W in the unit inverter 20. In each of the unit inverters 10 and 20, AC currents are added up for each phase and input to the three-phase-to-two-phase converter 17. To be more specific, the U-phase currents I1U and I2U are added up by the adder 14, the V-phase currents I1V and I2V are added up by the adder 15, and the W-phase currents I1W and I2W are added up by the adder 16. This addition makes compensated three phase AC currents IU, IV, and IW in which circulating currents flowing between the unit inverters 10 and 20 are eliminated. The three-phase-to-two-phase converter 17 converts the three phase AC currents IU, IV, and IW into stator winding currents Id and Iq based on the d-q axis rotary coordinate system, and outputs the stator winding currents Id and Iq into the flux computing unit 6.

The flux computing unit 6 calculates a d-axis component $\Phi\ 2d$ of a magnetic flux interlinked with the rotor in the motor 2 using the stator winding currents Id and Iq, and the d-axis and q-axis voltage command values V1d and V1q for stator winding voltage sent from the d-axis current controller 81 and q-axis current controller 91. The d-axis component flux $\Phi\ 2d$ calculated by the flux computing unit 6 is input to the subtractor 27. The subtractor 27 computes a difference between the d-axis component flux $\Phi\ 2d$ and the command value $\Phi\ 2d^*$ of a d-axis component flux. The flux controller 29 amplifies the difference and outputs the result as a d-axis stator winding current command value I1d*.

On the other hand, the speed detector 3 detects the angular speed $\omega$ r of the rotor in the induction motor 2. The subtractor 28 computes a difference from an angular speed command value $\omega$ r* for the rotor. The speed controller 30 amplifies the difference and outputs the result as a q-axis stator winding current command value I1q*.

The current control by the first unit inverter 10 in the power converter 1 will be described.

The three-phase-to-two-phase converter 51 converts the detected three phase AC currents I1U, I1V, and I1W into the stator winding currents I1d and I1q in the d-q coordinate system that rotates in synchronization with a frequency $\omega$ 1 of three phase AC voltages V1U, V1V, and V1W applied to the stator winding in the motor 2. The three phase AC currents I1U, I1V, and I1W are converted into the stator winding currents I1d and I1q according to the following expressions (1) and (2):

$$\theta 1 = \int \omega 1 dt \quad (1)$$

$$\begin{bmatrix} I1d \\ I1q \end{bmatrix} = \sqrt{2/3} \begin{bmatrix} \cos\theta 1, \cos(\theta 1 - 2/3\pi), \cos(\theta 1 + 2/3\pi) \\ -\sin\theta 1, -\sin(\theta 1 - 2/3\pi), -\sin(\theta 1 + 2/3\pi) \end{bmatrix} \begin{bmatrix} I1U \\ I1V \\ I1W \end{bmatrix} \quad (2)$$

The d-axis current controller 81 amplifies a difference between the d-axis current command value I1d* output from the flux controller 29 and the stator winding current I1d calculated according to the above expressions (1) and (2), and then outputs a d-axis voltage command value V1d for stator winding voltage. As for a q-axis component, similarly, the q-axis current controller 91 outputs a q-axis voltage command value V1q. The d-axis voltage command value V1d and q-axis voltage command value V1q are converted into three phase instantaneous voltage command values V1U, V1V, and V1W by the two-phase-to-three-phase converter 71. The d- and q-axis voltage command values V1d and V1q are converted into the three phase instantaneous voltage command values V1U, V1V, and V1W according to the following expression (3):

$$\begin{bmatrix} v_1U \\ v_1V \\ v_1W \end{bmatrix} = \sqrt{2/3} \begin{bmatrix} \cos\theta 1, & -\sin\theta 1 \\ \cos(\theta 1 - 2/3\pi), & -\sin(\theta 1 - 2/3\pi) \\ \cos(\theta 1 + 2/3\pi), & -\sin(\theta 1 + 2/3\pi) \end{bmatrix} \begin{bmatrix} v_1d \\ v_1q \end{bmatrix} \quad (3)$$

The calculated three phase instantaneous voltage command values V1U, V1V, and V1W are supplied to the PWM control circuit in the power converter 1. The PWM control circuit controls the switching of the transistors in the unit inverter 10.

Next, slip-frequency computation will be described. Supposing the aforesaid current control system runs at a sufficiently high speed; the d and q-axis current command values for the stator winding are regarded as I1d*=I1d and I1q*=I1q respectively. Assuming that the stator winding currents I1d and I1q are inputs, the equations of state of the system in the induction motor 2 are provided as follows:

$$d\Phi 2d/dt = -\alpha\Phi 2d + \omega s\Phi 2q + \beta I1d \quad (4)$$

$$d\Phi 2q/dt = -\alpha\Phi 2q - \omega s\Phi 2q + \beta I1q \quad (5)$$

$$d\omega r/dt = \gamma(I1q\Phi 2d - I1d\Phi 2q) \quad (6)$$

where, α, β, and γ are positive constants depending on the induction motor 2. Φ 2d is a d-axis component of a rotor winding interlinkage flux (hereinafter, d-axis component flux). Φ 2q is a q-axis component of the rotor winding interlinkage flux (hereinafter, q-axis component flux). ω r is an angular speed of a rotor. ω s is a slip frequency, which is represented as follows:

$$\omega s = \omega 1 - \omega r \quad (7)$$

Assuming that $$\omega s = \beta(I1q/I01\ 2d) \quad (8)$$

the equation (5) is simplified as follows:

$$d\Phi 2q/dt = -\alpha\Phi 2q \quad (9)$$

where, α is larger than zero. The q-axis component flux Φ 2q therefore approaches zero as time elapses. After certain time has elapsed, Φ 2q is regarded as zero.

The d-axis component flux Φ 2d calculated by the flux computing unit 6 and the current command value I1q* output from the speed controller 30 are fed to the divider 31 and coefficient multiplier 32. As a result, a command value ω s* for a slip frequency ω s is calculated according to the expression (8). The adder 26 adds up the slip frequency command value ω s* and rotor angular speed ω r, and thus provides an AC voltage frequency ω 1 to be applied to the stator winding. The two-phase-to-three-phase converter 71 and the power converter 1 then applies AC voltage with a frequency ω 1 to the induction motor 2.

Next, flux control will be described. If the aforesaid slip-frequency control causes the q-axis component flux Φ 2q to be equal to zero, the flux can be controlled by controlling the d-axis component flux Φ 2d. When Φ 2q=0 is assigned to the equation (4), the following equation is provided:

$$d\Phi 2d/dt = -\alpha\Phi 2d + \beta I1d \quad (10)$$

As apparent from the above equation, the d-axis component flux Φ 2d can be set to a desired value by controlling the d-axis stator winding current I1d. The flux controller 29 amplifies a difference between the d-axis component flux command value Φ 2d* and d-axis component flux Φ 2d to output a stator winding current command value I1d.

Next, speed control will be described. If the slip-frequency control provides Φ 2q=0 and the flux control provides Φ 2d=—Φ 2d* (constant), the equation (6) is simplified as follows:

$$d\omega r/dt = \gamma \Phi 2d^* I1q \quad (11)$$

The rotor angular speed ω r can therefore be set to a desired value by controlling the q-axis stator winding current I1q. The speed controller 30 amplifies a difference between the command value ω r* for a rotor angular speed and an actual value ω r to output a command value I1q* for the q-axis stator winding current I1q.

Similarly to the first unit inverter 10, the second unit inverter 20 in the power converter 1 is controlled by means of the flux controller 29, speed controller 30, three-phase-to-two-phase converter 52, two-phase-to-three-phase converter 72, d-axis current controller 82, and q-axis current controller 92.

As described above, according to this embodiment, the detected values of three phase AC currents provided by the adders 14, 15, and 16 do not contain the components of circulating currents flowing between the unit inverters 10 and 20. The stator winding currents Id and Iq provided by the three-phase-to-two-phase converter 17 therefore do not contain any circulating current component. Consequently, a secondary magnetic flux, a slip frequency, and other control variables, which are necessary to control the induction motor 2, can be calculated without taking account of any element of disturbance. This results in stable control.

Figure 2:
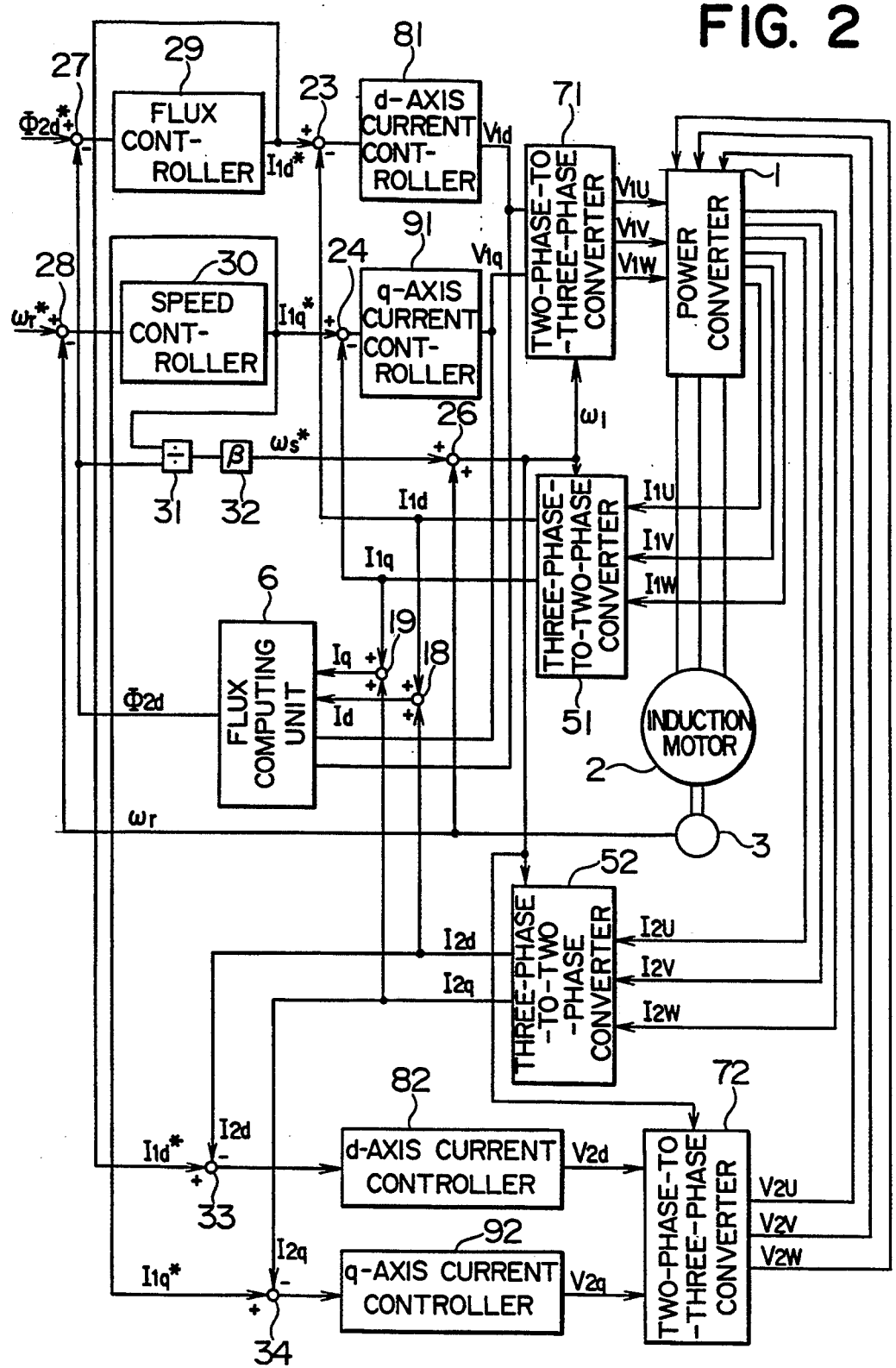
FIG. 2 is a block diagram showing a parallel running control apparatus relating to Embodiment 2.

Embodiment 2:

FIG. 2 shows a parallel running control apparatus for PWM inverters relating to Embodiment 2 of the present invention. This control apparatus is identical to the control apparatus of Embodiment 1 shown in FIG. 1 except that the adders 14 to 16 and the three-phase-to-two-phase converter 17 are excluded, and that the output terminals of the three-phase-to-two-phase converters 51 and 52 are connected to the flux computing unit 6 via adders 18 and 19.

In Embodiment 2, the stator winding currents I1d and I2d output from the three-phase-to-two-phase converters 51 and 52 are summed up by the adder 18 while the stator winding currents I1q and I2q are summed up by the adder 19. Consequently, compensated stator winding currents Id and Iq in which circulating currents flowing between the unit inverters 10 and 20 are eliminated are supplied to the flux computing unit 6. The flux computing unit 6 calculates a d-axis component $\Phi 2d$ of a flux interlinked with the rotor in the motor 2 using these stator winding currents Id and Iq, and the d and q-axis voltage command values V1$d$ and V1$q$ for stator winding voltage provided by the d-axis current controller 81 and q-axis current controller 91.

Thereafter, an operation similar to that in Embodiment 1 is carried out to control the first and second unit inverters 10 and 20 in the power converter 1.

As described above, according to Embodiment 2, the stator winding currents Id and Iq provided by the adders 18 and 19 do not contain the components of circulating currents flowing between the output terminals of separate phases of the unit inverters. Similarly to Embodiment 1, a secondary magnetic flux, a slip frequency, and other control variables, which are necessary to control the induction motor 2, can be calculated without taking account of an element of disturbance. This results in stable control.

In Embodiment 1, the detected values of three phase AC currents of the unit inverters are summed up for each phase and, thereafter, three-phase-to-two-phase conversion is performed to provide stator winding currents Id and Iq. In Embodiment 2, however, the detected values of three phase AC currents of the unit inverters are converted into two-phase DC components and, thereafter, the DC components are summed up for each axis to provide stator winding currents Id and Iq compared with the addition of AC components, the addition of DC components are hardly affected by noises or offset current. Furthermore, the three-phase-to-two-phase converter 17 in Embodiment 1 becomes unnecessary, contributing to simplification of circuitry.

What is claimed is:

1. A parallel running control apparatus for PWM inverters which controls the parallel running of a plurality of unit inverters controlled in pulse width modulation to supply AC power to a load, output terminals of the unit inverters being connected to each other via interphase reactors, said apparatus comprising:

a current detecting means for detecting three phase AC currents output from the plurality of unit inverters;

a compensating means for adding the values of three phase AC currents detected by said current detecting means for each phase to compensate the three phase AC currents so as to eliminate components of circulating currents flowing between said plurality of unit inverters; and a control means for outputting three phase voltage command values to said plurality of unit inverters, respectively based on the three phase AC currents compensated by said compensating means.

2. An apparatus according to claim 1, wherein said current detecting means includes a plurality of current transformers for outputting first, second and third phase components, said compensating means including first, second and third adders for adding the first, second and third phase components, respectively, output from the current transformers.

3. An apparatus according to claim 1, wherein said control means includes:

a plurality of first three-phase-to-two-phase converters for converting the three phase AC currents of the unit inverters detected by said current detecting means into first stator winding currents in a biaxial rotary coordinate system;

a second three-phase-to-two-phase converter for converting the three phase AC currents compensated by said compensating means into second stator winding currents in the biaxial rotary coordinate system;

a flux computing unit for computing a flux interlinked with a rotor of a load using the second stator winding currents and stator winding voltage command values in the biaxial rotary coordinate system;

mean for generating a first stator winding current command value;

a command value generating means for generating stator winding voltage command values in the biaxial rotary coordinate system for the plurality of unit inverters, respectively, based on the first stator winding currents and the first stator winding current command value; and a plurality of two-phase-to-three-phase converters for converting the voltage command values generated by said command value generating means into three phase voltage command values.

4. An apparatus according to claim 3, further comprising a speed detector for detecting an angular speed of a rotor of the load, said command value generating means generating the stator winding voltage command values based on the first stator winding currents the flux computed by said flux computing unit and the angular speed detected by said speed detector.

5. An apparatus according to claim 4, wherein said command value generating means includes:

a first subtractor for calculating a difference between the flux computed by said flux computing unit and a flux command value provided externally;

a flux controller for generating a d-axis current command value in the rotary coordinate system based on the difference calculated by said first subtractor;

a plurality of second subtractors for calculating differences between the d-axis current command value generated by said flux controller and first d-axis stator winding currents;

a plurality of d-axis current controllers for generating d-axis voltage command values in the rotary coordinate system based on the differences calculated by said plurality of second subtractors;

a third subtractor for calculating a difference between the angular speed detected by said speed detector and an angular speed command value provided externally;

a speed controller for generating a q-axis current command value in the rotary coordinate system based on the difference calculated by said third subtractor;

a plurality of fourth subtractors for calculating differences between first current command value generated by said speed controller and q-axis stator winding currents;

a plurality of q-axis current controllers for generating q-axis voltage command values in the rotary coordinate system based on the differences calculated by said plurality of fourth subtractors.

6. An apparatus according to claim 5, further comprising a frequency control circuit for determining an AC voltage frequency based on the flux computed by said flux computing unit, the current command value generated by said speed controller and the angular speed detected by said speed detector, and for outputting a frequency to said plurality of first three-phase-totwo-phase converters and said plurality of two-phase-to-three-phase converters.

7. An apparatus according to claim 6, wherein said frequency control circuit includes:
- a divider for dividing the current command value generated by said speed controller by the flux computed by said flux computing unit;
- a coefficient multiplier for multiplying the output of said divider by a coefficient; and
- a second adder for adding the angular speed detected by said speed detector to the output of said coefficient multiplier.

8. A parallel running control apparatus for PWM inverters which controls the parallel running of a plurality of unit inverters controlled in pulse width modulation to supply AC power to a load, output terminals of the unit inverters being connected to each other via interphase reactors, said apparatus comprising:
- a current detecting means for detecting three phase AC currents output from the plurality of unit inverters;
- a plurality of three-phase-to-two-phase converters each converting the three phase AC currents of one of the unit inverters detected by said current detecting means into a stator winding currents in a biaxial rotary coordinate system;
- a compensating means for adding the stator winding currents converted by said plurality of three-phase-to-two-phase converters for each coordinate axis to compensate the stator winding currents so as to eliminate components of circulating currents flowing between the plurality of unit inverters;
- a control means for outputting current command values in the biaxial rotary coordinate system, respectively, to the plurality of unit inverters based on the stator winding currents compensated by said compensating means; and
- a plurality of two-phase-to-three-phase converters for converting voltage command values output from said control means into three phase voltage command values.

9. An apparatus according to claim 8, wherein said current detecting means includes current transformers associated with the outputs of separate phases of the unit inverters, said compensating means including two first adders for adding the outputs of said plurality of three-phase-to-two-phase converters for each coordinate axis.

10. An apparatus according to claim 8, wherein said control means includes:
- means for generating a stator winding current command;
- a command value generating means for generating stator winding voltage command values in the biaxial coordinate system for a plurality of unit inverters, respectively, based on the stator winding currents converted by said plurality of three-phase-to-two-phase converters and the stator winding current command; and
- a flux computing unit for computing a flux interlinked with a rotor of a load based on the stator winding currents output by said compensating means and the stator winding voltage command values in the biaxial rotary coordinate system.

11. An apparatus according to claim 10, further comprising a speed detector for detecting an angular speed of a rotor of the load, said command value generating means generating the stator winding voltage command values based on the stator winding currents converted by said plurality of three-phase-to-two-phase converters, the flux computed by said flux computing unit and the angular speed detected by said speed detector.

12. An apparatus according to claim 11, wherein said command value generating means includes:
- a first subtractor for calculating a difference between the flux computed by said flux computing unit and a flux command value provided externally;
- a flux controller for generating a d-axis current command value in the rotary coordinate system based on the difference calculated by said first subtractor;
- a plurality of second subtractors for calculating differences between the d-axis current command value generated by said flux controller and d-axis stator winding currents in the rotary coordinate system converted by said plurality of three-phase-to-two-phase converters;
- a plurality of d-axis current controllers for generating d-axis voltage command values in the rotary coordinate system based on the differences calculated by said plurality of second subtractors;
- a third subtractor for calculating a difference between the angular speed detected by said speed detector and an angular speed command value provided externally;
- a speed controller for generating a q-axis current command value in the rotary coordinate system based on the difference calculated by said third subtractor;
- a plurality of fourth subtractors for calculating differences between the current command value generated by said speed controller and q-axis stator winding currents in the rotary coordinate system converted by said plurality of three-phase-to-two-phase converters; and
- a plurality of q-axis current controllers for generating q-axis voltage command values in the rotary coordinate system based on the differences calculated by said plurality of fourth subtractors.

13. An apparatus according to claim 12, further comprising a frequency control circuit for determining an AC voltage frequency based on the flux computed by said flux computing unit, the current command value generated by said speed controller and the angular speed detected by said speed detector, and for outputting the frequency to said plurality three-phase-to-two-phase converters and said plurality of two-phase-to-three-phase converters.

14. An apparatus according to claim 13, wherein said frequency control circuit includes:
- a divider for dividing the current command value generated by said speed controller by the flux computed by said flux computing unit;
- a coefficient multiplier for multiplying the output of said divider by a coefficient; and
- a second adder for adding the angular speed detected by said speed detector to the output of said coefficient multiplier.

* * * * *